Oct. 5, 1965    R. C. McLAUGHLIN ETAL    3,210,727
INDICATING CIRCUITS FOR VEHICLE ELECTRICAL SYSTEMS
Filed June 18, 1962                                          2 Sheets-Sheet 1
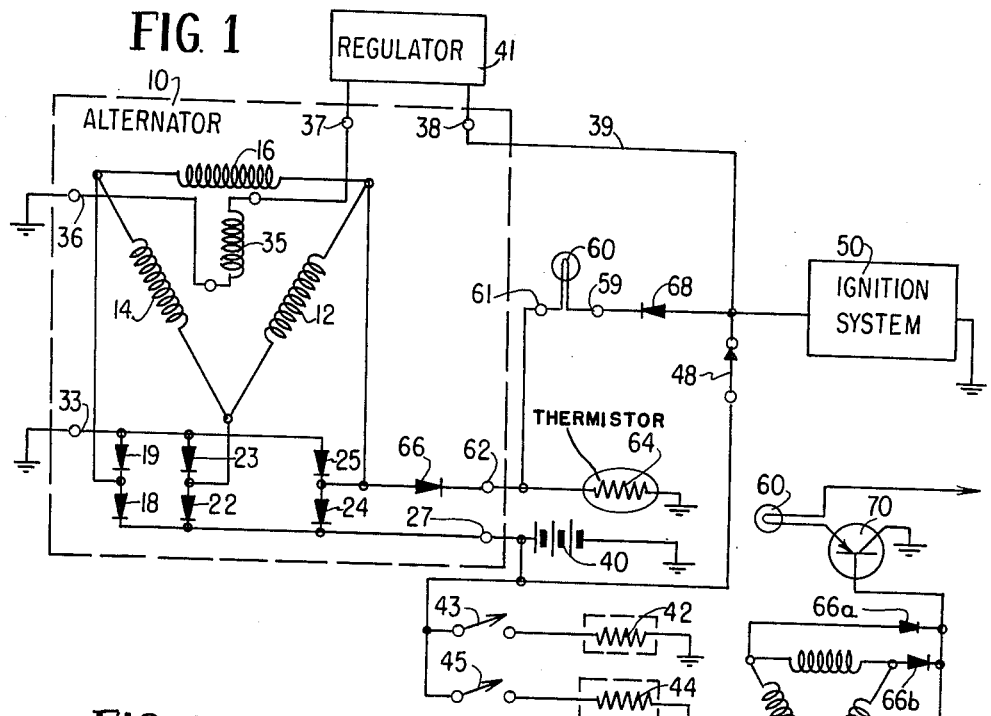
FIG. 1
FIG. 2
FIG. 2a
*INVENTOR.*
ROBERT C. McLAUGHLIN
BY NICHOLAS T. NEOPOLITAKIS
Mueller & Aichele
ATTYS.
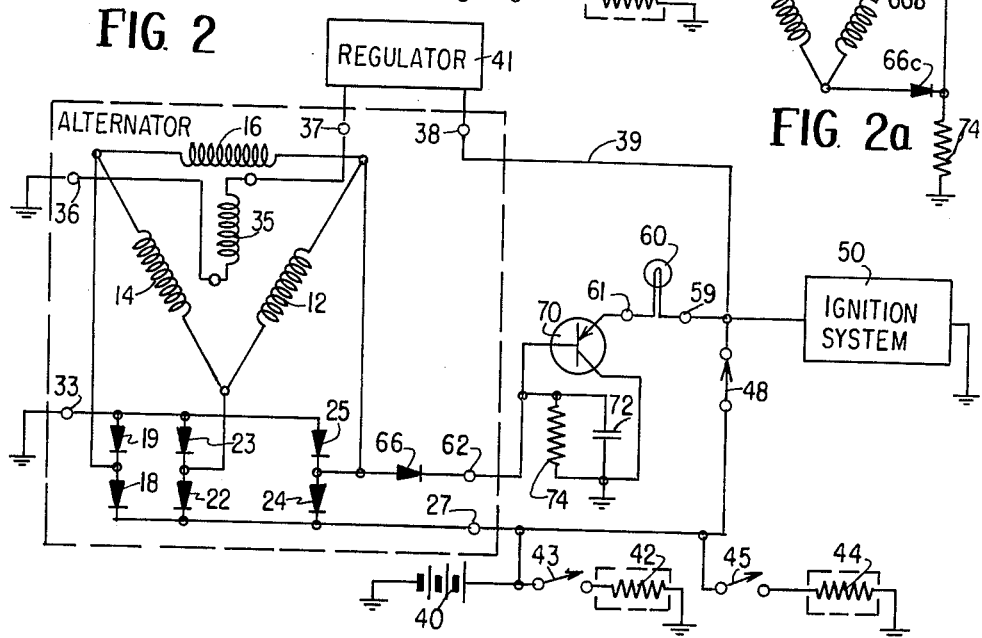

Oct. 5, 1965  R. C. McLAUGHLIN ETAL  3,210,727
INDICATING CIRCUITS FOR VEHICLE ELECTRICAL SYSTEMS
Filed June 18, 1962  2 Sheets-Sheet 2
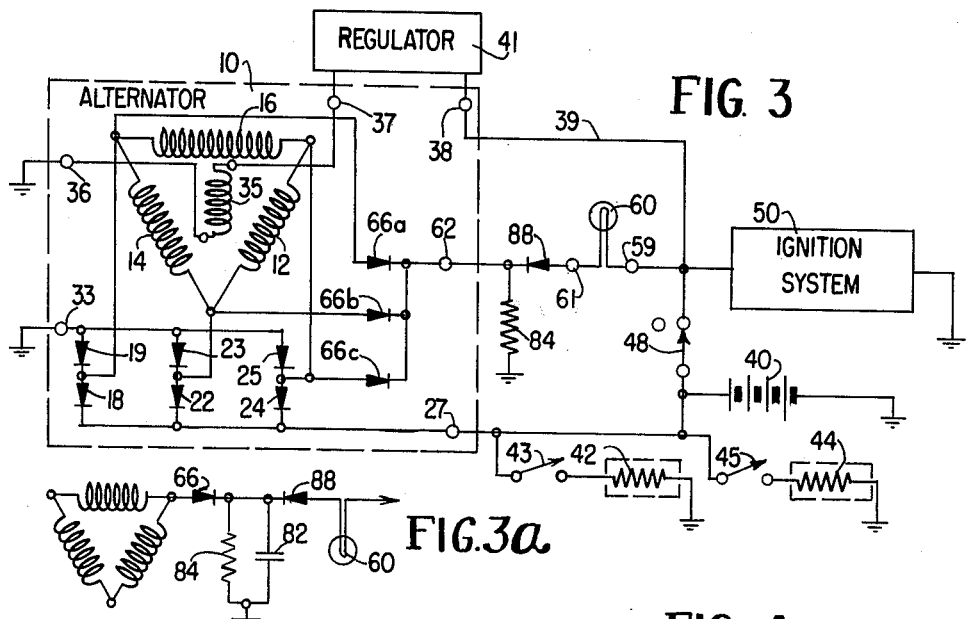
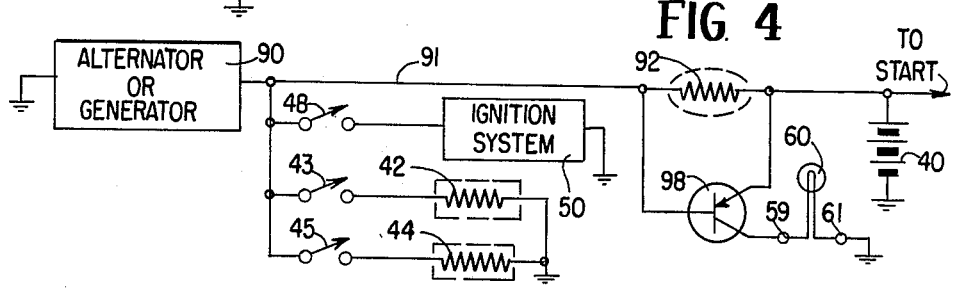
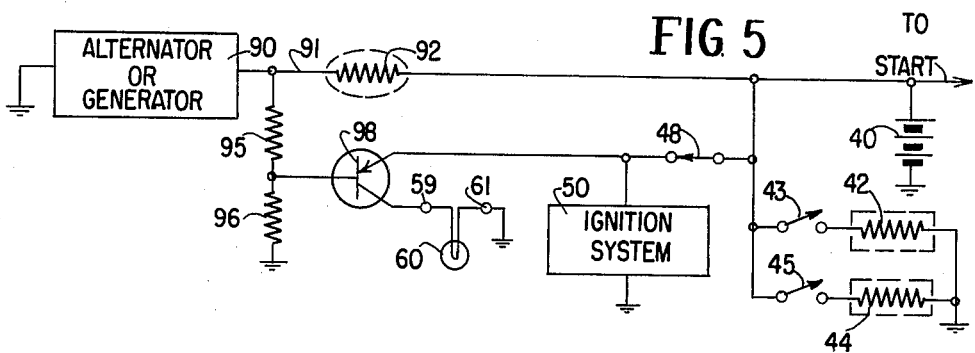
INVENTORS
ROBERT C. MCLAUGHLIN
BY NICHOLAS T. NEOPOLITAKIS
Mueller & Aichele
ATTYS.

United States Patent Office

3,210,727
Patented Oct. 5, 1965

3,210,727
INDICATING CIRCUITS FOR VEHICLE
ELECTRICAL SYSTEMS
Robert C. McLaughlin, Bloomingdale, and Nicholas T. Neapolitakis, Chicago, Ill., assignors to Motorola, Inc., Chicago, Ill., a corporation of Illinois
Filed June 18, 1962, Ser. No. 203,171
15 Claims. (Cl. 340—52)

This invention relates to vehicular electrical systems and more particularly to circuits providing an indication when the storage battery of such a system is not being properly charged by the alternator or generator of the system. The indicating circuits of this invention are especially useful when incorporated with vehicular electrical systems employing an alternator for supplying charging current to the storage battery.

Many present day vehicles such as automobiles use a generator to charge a battery for the electrical system and a warning light which is visible on the dashboard to indicate when the battery is not being properly charged by the generator. It has further been recognized that an alternator with appropriate rectifier circuitry may be substituted for the usual generator in automotive electrical systems. Although an alternator offers desirable advantages from the standpoint of reliability, economy of operation and ease of maintenance, a direct substitution of an alternator for a generator cannot be accomplished without certain circuit modifications of the overall system.

For example, a generator usually draws a substantial back current in the form of a drain on the battery when the generator prime mover comes to an idle speed and ceases to generate sufficient voltage to overcome the system potential. For this reason vehicular systems using a generator employ a back current relay to prevent this drain, which relay may also be used to activate an indicating light when sufficient voltage is not being generated to charge the battery. Since the back current relay is not required when an alternator is used in the system, and since there is an increasing trend in the automotive industry to utilize electronic components such as semiconductors rather than electromechanical components such as relays whenever possible in the electrical system, it is desirable to use an all electronic circuit to activate the indicating light. In that they have no moving parts and particularly in that they have no mechanical contacts to make and break electrical currents, electronic components such as semiconductors and other solid state devices inherently provide longer life and more reliable operation in automotive electrical systems.

Accordingly, it is an object of this invention to provide improved battery charging indicating circuits for use with vehicular electrical systems, which circuits are simple, economical and utilize components having a long life.

Another object of this invention is to provide battery charging indicating circuits which are particularly adapted for use in vehicular electrical systems using an alternator and associated suitable rectifiers.

A further object of this invention is the provision of a battery charging indicating circuit capable of sampling all the phase voltages or sampling any selected phase voltage of a vehicle electrical system employing an alternator and rectifiers to indicate faulty operation thereof.

A feature of the invention is the provision of a charge indicating circuit including an indicating lamp and voltage sensing means connected between at least one phase of an alternator output and the battery of a charging circuit in a vehicular electrical system incorporating an alternator and power rectifiers.

Another feature of the present invention is the provision of a voltage sensitive resistor in a battery charging circuit incorporating an alternator and power rectifiers to cause an indicating lamp to glow when the alternator is not providing sufficient output to prevent current drain on the battery.

Still another feature of the present invention is the provision of a transistor and an indicating lamp in a battery charging circuit incorporating an alternator and power rectifiers and means controlling the transistor to cause the lamp to glow when there is current drain on the battery and to cause the lamp to be extinguished when the alternator is properly charging the battery.

A still further feature of the present invention is the provision of an indicating circuit in a battery charging system incorporating an alternator and power rectifiers, which indicating circuit includes an indicating lamp and a semiconductor means connecting the lamp to at least one phase of the alternator output to indicate proper operation of the alternator.

Yet another feature of the present invention is the provision of a transistor controlled by circuit wiring resistance in a vehicular electrical system to supply energization current to an indicating lamp. Voltage drop across selected conductors in the system functions to cause the transistor to conduct and energize the indicating lamp when there is current drain on the battery, and causes the transistor to remain cut-off when proper system potential is maintained, thereby extinguishing the indicating lamp.

In the drawings:
FIG. 1 is a schematic diagram of a vehicular electrical system incorporating the present invention;
FIG. 2 is a system comparable to that of FIG. 1 incorporating a modified embodiment of the invention;
FIG. 2a is a simplified schematic showing a modification of the circuit of FIG. 2;
FIG. 3 is a vehicular electrical system showing a still further modification of the invention;
FIG. 3a is a simplified schematic showing a modification of FIG. 3;
FIG. 4 is a further modification of the indicating circuit of the present invention; and
FIG. 5 is a modification of the indicating circuit of FIG. 4.

In a specific form the invention is utilized with a vehicular electrical system having an alternator and associate rectifiers to provide a direct current output. The rectifier output is connected to the storage battery of the system so that the battery may be charged when the prime mover for the alternator causes it to rotate at a predetermined speed. A switch connects the battery to the ignition system of the vehicle, and an indicating circuit connected between one side of the switch and a selected point on the alternator is energized whenever there is current drain on the battery. If, on the other hand, there is sufficient output from the alternator to charge the battery and to supply current to electrical assessories on the vehicle, the indicating lamp is extinguished. The indicating circuit includes a semiconductor device such as a transistor or a diode or includes a voltage sensitive resistor to control energization current to the indicating lamp. The indicating circuit may be connected to one phase of the alternator output or to all three phases to indicate defective operation of at least one phase of the alternator.

In FIG. 1 alternator 10, which may be driven from the engine of a vehicle in which the electrical system is incorporated, includes armature windings 12, 14 and 16 connected in delta. As an alternative a Y connection could also be used. The corners of the delta are connected to the respective interconnections of power rectifier pairs 18, 19 and 22, 23 and 24, 25. The equivalent of the anodes of rectifiers 19, 23 and 25 are interconnected to the frame of the alternator or a reference ground 33. The equivalent of the cathode of rectifiers 18, 22 and 24 are connected to an intermediate output terminal 27 of the alternator. This arrangement provides a three phase full wave rectifier circuit so that a direct current voltage, positive with respect to the reference point, appears at terminal 27 in response to full wave rectification of the three phase output of the alternator windings 12, 14 and 16.

A field winding 35 of the alternator is connected to the usual slip rings and brushes (not shown) to a ground reference or frame of the alternator at terminal 36. Field current is supplied through winding 35 at terminal 37. The field current to the alternator and hence the output of the alternator may be regulated by regulator 41, connected between terminal 37 and terminal 38 of the alternator, which terminal 38 in turn receives field current via lead 39 from a suitable sampling point in the system, such as one side of ignition switch 48. The regulator circuit forms no part of this invention, but by way of example may be a transistorized voltage regulator including a series current regulating transistor and a voltage sampling circuit responsive to voltage changes occurring on lead 39. In addition to regulating the output voltage of the alternator-rectifier combination, regulator 41 also provides a path for initial field current to allow alternator to build up desired output terminal voltage.

A storage battery 40 providing, for example, 12 volts is connected between output terminal 27 of the alternator and the reference point of the electrical system. Various items of electrical equipment are shown representatively connected to the battery 40. These include electrical load 42 series connected with a control switch 43 across battery 40 and an electrical load 44 series connected with switch 45 across battery 40. The electrical loads 42 and 44 represent such items as the starter for the vehicle, lights for the vehicle, a radio for the vehicle and other pieces of electric equipment.

Ignition switch 48 includes a movable contact connected to the positive terminal of battery 40 and a fixed contact connected to the ignition circuit 50 for an internal combustion engine of the vehicle. It can be seen that under normal operating conditions the regulated output appearing at terminal 27 of the alternator will supply charging current for battery 40, current for the vehicle accessories represented by resistors 42 and 44 and energizing current for ignition system 50. If, however, the voltage appearing at terminal 27 falls below that required by the system, there will be a current drain from battery 40 to supply accessories 42 and 44 and to provide energization current for ignition system 50. It is desirable to provide an indication to warn the driver of the vehicle when this situation exists. Typically such an indication includes a no-charge or tell-tale light mounted on the dashboard of the vehicle to function as a warning indicator whenever there is current drain on the battery.

To this end lamp 60, having input terminals 59 and 61, is connected between a point in the ignition system common to the positive terminal of battery 40 and terminal 62 of alternator 10, as shown in FIG. 1. Thermistor 64, having a positive temperature coefficient, is connected between lamp terminal 61, common to alternator terminal 62, and the reference point or ground of the system. Diode 66 is connected between one corner of the delta formed by the alternator windings and terminal 62 and is poled to provide a rectified output of a given phase of the alternator at terminal 62. Diode 68, connected between lamp terminal 59 and the fixed contact of switch 48, is provided to isolate the output appearing at alternator terminal 62 from the remainder of the electrical system. This diode is poled to allow current from battery 40 to flow through lamp 60 and thermistor 64 to ground reference but to prevent the alternator output from causing current flow back through lamp 60 and ignition system 50 to ground reference.

It can be seen that when ignition switch 48 is turned on, lamp 60 and thermistor 64 form a series current path between the positive terminal of battery 40 and the ground reference potential of the system. Thermistor 64 is selected to be of relatively low value when there is no alternator output so that there will be sufficient current flow to cause lamp 60 to glow brightly under these conditions. As the alternator output and thus the voltage appearing at terminal 62 increases, the resistance of positive temperature coefficient thermistor 64 begins to increase so that less current is drawn by lamp 60. By proper selection of lamp 60 and thermistor 64, lamp 60 will not glow when the output of the alternator appearing at terminal 62 is sufficient to prevent discharge of battery 40 into the remainder of the electrical system. By way of example, a 12 volt lamp and a 20 ohm (nominal) thermistor will give good indication when there is no alternator output. When the alternator output rises to approximately 15 volts, the resistance of thermistor 64 will increase to 270 ohms. This is sufficient to limit current through lamp 60 so that there will be no visible glow. Any intermediate output voltage of alternator 10 will permit lamp 60 to glow to a lesser degree.

When the ignition switch 48 is opened the engine of the vehicle will usually turn over for a few seconds. To prevent an undesirable flashing of lamp 60 when current from terminal 62 flows through the lamp and through the breaker points of ignition system 50 to ground, isolation diode 68 is provided. It should be noted that neither diodes 66 nor 68 are called on to conduct current approaching full alternator output, and that it is only necessary that they handle such current as is required to energize lamp 60 and thermistor 64 respectively. Diodes 66 and 68 therefore may be relatively inexpensive and reliable commercially available items, and along with thermistor 64 provide an extremely simple indicating lamp circuit for the alternator system. Also, since thermistor 64 is an RMS device, it provides an adequate response to one phase of the alternator output without any undesirable flickering of lamp 60 so that a single diode 66 may be used without additional filtering.

As shown in FIG. 2, wherein like reference numerals refer to like circuit elements, a transistor 70 may be used in place of thermistor 64 in the indicating circuit of the present invention. The emitter electrode of transistor 70 is connected to lamp 60 and its base electrode is connected to terminal 62 on alternator 10. Resistor 74 shunted by capacitor 72 further connects the base of transistor 70 to the ground reference potential of the system. The collector electrode is connected directly to ground reference potential. Since transistor 70 is a unidirectional current device, it is not necessary to provide an isolation diode between lamp terminal 59 and ignition system 50.

When the output of a given phase of alternator 10 is above a predetermined value, as established at terminal 62 through diode 66, the positive voltage developed across resistor 74 maintains transistor 70 in a cutoff condition. The emitter to collector path of the transistor is an effective open circuit and lamp 60 will not glow. When the output of the alternator drops below a desired value, transistor 70 begins to conduct to produce a current path for lamp 60 between the emitter and collector electrodes to ground reference potential. The degree of conduction and hence the brilliance of light 60 is determined by the voltage developed across resistor 74, and by selection of components full brilliance can be obtained when there is no output appearing at terminal 62.

Relatively large value filter capacitor 72 retains the voltage across resistor 74 at a peak value so that it is only necessary to sample one phase of the alternator output. If desired, capacitor 72 may be eliminated as shown in FIG. 2a. In this modification three diodes 66a, 66b and 66c are connected one from each phase of the alternator winding to the base electrode of transistor 70. This arrangement provides a three-phase voltage across resistor 74 in which there are insufficient missing pulses to the biasing arrangement for transistor 70 to cause any flickering of lamp 60.

A further modification of the indicating circuit of FIG. 2 is shown in FIG. 3. Three diodes 66a, 66b and 66c are each connected from a corner of the delta winding of the alternator to a common point on terminal 62. Resistor 84 connects terminal 62 to a ground reference. Diode 88, poled in an opposite direction to diodes 66a, 66b and 66c, is connected in series between terminal 62 and lamp 60. With ignition switch 48 turned on but with no alternator output, current will flow from battery 40 to lamp 60, diode 88 and resistor 84 to ground reference. When an alternator output is developed at terminal 62, a voltage bucking that of the battery is supplied across resistor 84 such that current through lamp 60 is reduced. As the alternator output is increased, the brilliance of lamp 60 is reduced and becomes extinguished when the alternator output, as supplied across resistor 84 by diodes 66a, 66b and 66c, reaches a predetermined value. Diode 88 isolates the lamp 60 from the alternator output when ignition switch 48 is opened to prevent flashing of the bulb when grounded through ignition system 50. In a modification of the circuit of FIG. 3, as shown in FIG. 3a, diodes 66a, 66b and 66c may be replaced by a single diode 66 connected from one corner of the alternator winding to resistor 84. To prevent flickering of light 60 due to missing pulses when a single diode is used, capacitor 82 is shunted across resistor 84. This capacitor filters the single phase alternator output and maintains the voltage developed across resistor 84 at a constant peak value.

FIGS. 4 and 5 show modification of the present invention wherein a single transistor and an indicating lamp may be used to show whether or not the battery is charging or discharging. It should be noted that the modifications illustrated by these figures may be used with either an alternator or a generator arrangement. Lead 91 connects the direct current output of alternator or generator 90 to the positive terminal of battery 40. In the case of alternators of the types previously discussed, lead 91 may be connected to terminal 27. In practical applications this lead may be included in the harness wiring of the vehicular electrical system. This lead wire usually has a resistance in the order of from a few hundred to approximately a tenth of an ohm. It should be noted that for any application hereinafter described the resistance utilized need not necessarily encompass the entire resistance of the circuit wiring between alternator 90 and battery 40, but only a predetermined part of that resistance as can conveniently be connected to in a practical circuit application. By way of example, in FIG. 4 the resistance used to control transistor 98 may be that portion of the circuit wiring running from the starting solenoid to the ignition switch of the vehicle. It is only necessary that the portion of the lead wire of interest be series connected between the direct current output of the alternator or generator and the battery so that current will flow through it both upon charge of the battery by the alternator or generator and upon discharge of the battery into the remainder of the electrical system when the system voltage is not maintained by the alternator or generator.

Referring more specifically to FIG. 4, transistor 98 is connected with its base and emitter electrodes across a portion of lead wire 91 having a distributed resistance 92. This connection is conveniently made between any terminals available in a practical system which encompass the previously mentioned current paths. Lamp 60 is connected between the collector electrode of transistor 98 and ground reference potential. When the system is energized so that there is curren flow fom alternator or generator 90 to charge battery 40, a potential developed across resistor 92 is of a polarity which maintains transistor 98 cutoff. Accordingly, no current is drawn between emitter and collector electrodes of transistor 98 to energize lamp 60. If, however, the output of alternator or generator 90 is insufficient to overcome system potential, there is a current drain from battery 40 through accessories 42 and 44 and ignition system 50 to establish a voltage of opposite polarity across resistor portion 92. Transistor 98 becomes conducting, and results in energization of lamp 60, whose brilliance is controlled by the voltage drop across resistance portion 92 and hence total current drain on the battery. For example, transistor 98 will begin to conduit when there is sufficient current drain on battery 40 to cause the base electrode to become 0.15 to 0.20 volt negative with respect to the emitter and will increase conduction as the current drain increases. Proper selection of the resistance value 92 of lead 91 can therefore be made to cause energization of lamp 60 over a range of currents drawn by the ignition system and by the accessories of the vehicle.

In a modification shown in FIG. 5, a voltage dividing arrangement between resistors 95 and 96 provide further bias voltage for transistor 98. The junction point between these resistors is connected to the base electrode of transistor 98 so that when the output of alternator or generator 90 is sufficiently high to cause charging current to flow to battery 40, the voltage drop across resistor portion 92 in conjunction with the bias developed by resistors 95 and 96 retains transistor 98 cutoff. When the output of alternator or generator 90 drops below a predetermined value so that discharge current flows from battery 40, transistor 98 is biased to conduction and indication is shown by lamp 60. Since resistors 95 and 96 provide a leakage current for battery 40, their values can be made sufficiently high so that this leakage current is limited to one or two milliamperes so that there is negligible drain on the battery.

The systems described provide therefore simple and reliable circuits for energizing a no-charge or tell-tale light in a vehicular electrical system to serve as a warning that the alternator or generator of the system is not providing sufficient output to prevent discharge of the storage battery to the system. The indicating light circuits of the invention use solid state electrical and electronic components and do not use electromechanical devices such as relays. Thus reliability of operation and long life is enhanced. The circuits disclosed are particularly well adapted for use with alternators which do not require the use of a back current cutout relay. The embodiments shown provide flexibility of application so that the indicating circuits may be employed with present electrical system storage battery, a condition responsive resistor components and circuit modifications.

We claim:

1. In a vehicular electrical system having an alternator with an armature winding and associated rectifiers to provide direct current potential for charging the storage battery of the system and for providing energization current for electrical accessories of the system, an indicating circuit responsive to system potential to serve as a warning when the output of said alternator drops below a potential sufficient to prevent discharge of said battery into the system, including in combination, an indicating lamp having first and second terminals, circuit means for connecting said first lamp terminal to one side of the system storage battery, a condition resposive resistor connected between said second lamp terminal and a reference potential to complete the energization current path for said indicating lamp, with said condition responsive resistor being variable in response to current supplied thereto, and rectifier means connecting the armature winding of said alternator to the junction point between said second lamp terminal and said condition responsive resistor and applying the rectified output voltage of said winding to said condition responsive resistor to cause current flow therethrough and change the resistance thereof, whereby a change in alternator output voltage causes a change in illumination of said indicating lamp.

2. An indicating circuit for a vehicular electrical system having a storage battery, an alternator and associated rectifiers to provide a charging current for said battery, with said indicating circuit serving as a warning if the output of said alternator is insufficient to prevent discharge of said battery, the combination including an indicating lamp having first and second terminals, voltage responsive resistance means connected between said first lamp terminal and a reference potential, circuit means including a first diode for connecting said second lamp terminal to said storage battery, with said first diode poled to allow energization current to flow from said battery through said indicating lamp and said voltage responsive resistance means to said reference potential, second diode means connected to an armature winding of said alternator to provide a voltage indicative of the alternator output, and circuit means for applying said voltage to the junction point between said second lamp terminal and said voltage responsive resistance means so that the resistance in the energization current path for said indicating lamp is changed in response thereto, whereby the illumination of said lamp is indicative of the alternator output potential.

3. In a vehicular electrical system having an alternator and associated rectifiers to provide a direct current potential for charging the storage battery of the system and for providing energization current for electrical accessories of the system, an indicating circuit responsive to alternator output voltage to serve as a warning if such output drops below system potential, the combination including an indicating lamp having first and second terminals, a positive temperature coefficient thermistor device connected between said first lamp terminal and a reference potential, circuit means including a first diode for connecting said second lamp terminal to said storage battery, with said first diode poled to allow current flow from said battery through said indicating lamp and said thermistor to said reference potential, a second diode having anode and cathode electrodes, means connecting said anode electrode to an armature winding of said alternator, means connecting said cathode electrode to the junction point between said first lamp terminal and said thermistor, with said second diode providing a rectified voltage indicative of said alternator output to control the resistance of said thermistor in response thereto, whereby a decrease in alternator output results in a decrease of resistance in the lamp energization current path to increase illumination of said lamp.

4. In a vehicular electrical system having an alternator and associated rectifiers to provide a direct current potential for charging the storage battery of the system and for providing energization current for electrical accessories of the system, an indicating circuit responsive to alternator output voltage to serve as a warning if such voltage fails to remain at a desired level, the combination including an indicating lamp having first and second terminals, circuit means to connect said first lamp terminal to the system storage battery, a transistor having emitter, collector and base electrodes, means connecting said emitter electrode to said second lamp terminal, means connecting said collector electrode to said reference potential, and circuit means including a diode rectifier connecting said base electrode to an armature winding of said alternator to thereby control the emitter to collector conduction of said transistor, whereby increased alternator output decreases said conduction to decrease illumination of said indicating lamp.

5. An indicating circuit for a vehicular electrical system having a storage battery and an alternator and associated rectifiers to provide a charging current for the battery, with said indicating circuit serving as a warning if the output of said alternator is insufficient to prevent discharge of said battery, the combination including an indicating lamp having first and second terminals, a transistor having a first electrode connected to said first terminal and a second electrode connected to a reference potential, with said transistor further having a third electrode, circuit means to connect said second lamp terminal to the system battery, a biasing resistor connected between said third electrode and said reference potential, capacitor means connected between said third electrode and said reference potential, diode means connected to an armature winding for providing an output voltage indicative of the output of said alternator, and means coupling said voltage to said biasing resistor to control the conduction of said transistor, so that a decrease in alternator ouput voltage increases the conduction of said transistor thereby causing increased illumination of said indicating lamp.

6. In a vehicular electrical system having an alternator, with said alternator having a plurality of armature windings and a plurality of rectifiers connected to said windings to provide a direct current potential for charging the system battery and for supplying current to electrical accessories of the system, an indicating circuit responsive to system potential to serve as a warning if the output provided by said alternator drops below a potential sufficient to prevent discharge of said battery into the system, the combination including an indicating lamp having first and second terminals, a transistor having emitter, collector and base electrodes, with said emitter electrode connected to said first lamp terminal and said collector electrode connected to a reference potential, circuit means to connect said second lamp terminal to the system battery, a plurality of diodes having anode and cathode electrodes, resistor means connecting said base electrode to said reference potential, means connecting said cathode electrodes to said base electrode, and means connecting the anode electrode of each said diode to individual armature windings of said alternator to provide a rectified voltage indicative of the output voltage of said windings, whereby said voltage controls the conduction of said transistor to cause illumination of said indicating lamp if the alternator output drops below system potential.

7. In a vehicular electrical system having an alternator and associated rectifiers to provide a direct current potential for charging the storage battery of the system and for providing energization current for electrical accessories of the system, an indicating circuit responsive to alternator output potential to serve as a warning if such potential fails to remain at a desired level, the combination including an indicating lamp having first and second terminals, circuit means to connect said first lamp terminal to the system storage battery, circuit means including a first diode series connected with a resistor connecting said second lamp terminal to a reference potential, with said diode poled to allow lamp energization current to flow from said system battery to said reference potential, capacitor means connecting said second lamp terminal to said reference potential, second diode means connected to an armature winding of said alternator to provide a direct current voltage indicative of alternator output potential, and circuit means for applying said voltage to the junction point between said first diode and said resistor, whereby an increase in alternator output potential provides a voltage at said junction point to decrease the flow of energization current through said indicating lamp.

8. An indicating circuit for a vehicular electrical system having a storage battery and an alternator with associated rectifiers to provide a charging current for said battery, with said indicating circuit serving as a warning if the output of said alternator is insufficient to prevent discharge of said battery, the combination including an indicating lamp having first and second terminals, circuit means to connect said first terminal to the system battery, first diode means having first and second electrodes, with the first electrode of said first diode means connected to said second lamp terminal and with resistor means connecting the second electrode of said first diode means to said reference potential, said first diode means being poled to provide an energization current path for said indicating lamp from the system battery to said reference potential, second diode means having first and second electrodes, means connecting the first electrode of said second diode means to an armature winding of said alternator and means connecting the first electrode of said second diode means to the second electrode of said first diode means, said second diode means being poled to apply a voltage across said resistor means indicative of the alternator ouput potential, whereby said voltage changes energization current flow through said indicating lamp to cause a change in illumination indicative of the alternator output.

9. In a vehicular electrical system having a storage battery, means to provide charging current for said battery, and a plurality of electrical accessories each having one side thereof commonly connected between said battery and said battery charging means and the other side thereof connected to a reference potential, an indicating circuit responsive to discharge current of said battery to serve as a warning of such discharge, including in combination, an indicating lamp having first and second terminals, with said first terminal connected to said reference potential, circuit wiring having a predetermined resistance connecting said battery charging means to said system battery, said circuit wiring also providing a current path between said battery and at least one said electrical accessory, a transistor having collector, emitter and base electrodes, means connecting said collector electrode to said second lamp terminal, means connecting said emitter electrode to said system battery, and means connecting said base electrode to said battery charging means, with said predetermined resistance of said circuit wiring forming an emitter to base biasing resistance for said transistor, so that charging current to said battery produces a voltage drop across said predetermined resistance to retain said transistor cutoff and discharge current from said battery produces a voltage drop across said predetermined resistance to cause said transistor to conduct, whereby emitter to collector current conduction provides energization current for said indicating lamp to indicate discharge of said battery.

10. An indicating circuit for a vehicular electrical system having a storage battery, means to provide charging current for the battery, and a plurality of electrical accessories each having one side thereof commonly connected to the battery and the battery charging means and the other side thereof connected to a reference potential, the combination including an indicating lamp having first and second terminals, with said first terminal connected to a reference potential, a transistor having collector, emitter and base electrodes, means connecting said collector electrode to said second lamp terminal, circuit wiring having a fixed resistance connecting said battery charging means to said system battery, said circuit wiring also providing a current path between said battery and at least one said electrical accessory, means connecting said emitter electrode to the end of said circuit wiring common with said system battery, means connecting the base electrode to the end of said circuit wiring common with said battery charging means, with said fixed resistance of said circuit wiring providing an emitter to base bias resistance for said transistor, so that charging current to said battery causes a voltage drop across said fixed resistance to retain said transistor cutoff, and so that discharge current from said battery provides a voltage drop across said fixed resistance to cause said transistor to conduct, whereby emitter to collector conduction provides energization current for said indicating lamp to indicate discharge of said battery.

11. In a vehicular electrical system having means to provide charging current for the system battery and for providing energization current for electrical accessories of the system, an indicating circuit responsive to discharge current of said battery to serve as a warning of such discharge, including in combination, an indicating lamp having first and second terminals, with said first terminal connected to said reference potential, circuit wiring having a predetermined resistance connecting said battery charging means to said system battery, a voltage divider including first and second resistors series connected between the output of said battery charging means and said reference potential, a transistor having collector, emitter and base electrodes, means connecting said collector electrode to said second lamp terminal, means to connect said emitter electrode to said system battery, means connecting said base electrode to the junction point of said first and second resistors to establish a quiescent bias for said transistor, with said predetermined resistance of said circuit wiring forming an emitter to base biasing resistance for said transistor, so that charging current for said battery causes a voltage drop across said predetermined resistance to retain said transistor cutoff with said transistor biased to conduction in the absence of said charging current, so that emitter to collector current conduction produces energization current for said indicating lamp.

12. An indicating circuit for vehicular electrical system having a storage battery and means to provide charging current for the battery, with said indicating circuit serving as a warning if the output of said charging means is insufficient to prevent discharge of said battery, the combination including an indicating lamp having first and second terminals, with said first terminal connected to a reference potential, a transistor having collector, emitter and base electrodes, means connecting said collector electrode to said second lamp terminal, circuit wiring having a fixed resistance connecting said battery charging means to said system battery, low resistance wiring to connect said emitter electrode to said battery, a voltage divider including first and second resistors series connected between the output of said battery charging means and said reference potential, and means connecting said base electrode to the junction point between said first and second resistors to establish a quiescent bias for said transistor, with said fixed resistance of said wiring conductor providing an emitter to base biasing resistance for said transistor, so that charging current from said battery causes a voltage drop across said fixed resistance to retain said resistor cutoff, with said transistor biased to conduction in the absence of said charging current, whereby emitter to collector conduction produces energization current for said indicating lamp.

13. An indicator circuit for a vehicular electrical system having a storage battery and an alternator with associated rectifiers to provide a charging current for said battery, with said alternator having a plurality of armature windings, and with said indicator circuit serving as a warning if the output of said alternator is insufficient to prevent discharge of said battery, the combination including an indicator lamp having first and second terminals, circuit means to connect said first terminal to the system battery, first diode means having first and second electrodes, with the first electrode of said first diode means connected to said second lamp terminal and with resistor means connecting the second electrode of said first diode means to said reference potential, said first diode means being poled to provide an energization current path for said indicator lamp from the system battery through said resistor means to said reference potential, second diode means having first and second electrodes, means connecting the first electrode of said second diode means to an armature winding of said alternator, and means connecting the second electrode of said second diode means to the second electrode of said first diode means, said second diode means being poled to supply a voltage across said resistor means indicative of alternator output, whereby said voltage changes energization current flow through said indicator lamp to cause a change in illumination indicative of the alternator output.

14. In a vehicular electrical system including an alternator having a plurality of armature windings, and a plurality of rectifiers associated with said windings to provide a direct current potential for charging the system battery and for providing current to electrical accessories of the system, an indicating circuit responsive to system potential to serve as a warning if the output provided by said alternator drops below a potential sufficient to prevent discharge of said battery into the system, the combination including an indicating lamp having first and second terminals, means to connect said first lamp terminal to the system battery, a first diode having first and second electrodes, with the first electrode of said first diode connected to said second lamp terminal and with resistor means connecting the second electrode of said first diode to said reference potential, said first diode being poled to provide an energization current path for said indicating lamp from the system battery and through said resistor means to said reference potential, a plurality of further diodes each having first and second electrodes, with the first electrode of each said further diodes connected to an armature winding of said alternator and with the second electrode of each said further diodes connected to the second electrode of said first diode, said plurality of further diodes poled to supply a voltage across said resistor means indicative of alternate output potential, whereby said voltage reduces energization current through said indicating lamp to thereby vary illumination of said lamp as an indication of alternator output potential.

15. In a vehicular electrical system having an alternator with an armature winding and associated rectifiers to provide direct current potential for charging the storage battery of the system and for providing energization current for electrical accessories of the system, an indicating circuit responsive to system potential to serve as a warning when the output of the alternator drops below a potential sufficient to prevent discharge of the battery into the system, said indicating circuit including in combination, an indicating lamp having first and second terminals, circuit means for connecting said first lamp terminal to one side of the system storage battery, a positive temperature coefficient thermistor connected between said second lamp terminal and a reference potential to complete the energization current path for said indicating lamp, said positive temperature coefficient thermistor having a resistance which increases with increased current flow therethrough, and rectifier means applying the voltage developed by the armature winding of the alternator to the junction between said second lamp terminal and said thermistor so that the rectified output voltage of the winding causes current flow through said thermistor to increase the resistance thereof, said thermistor having a value sufficient to limit current through said indicating lamp to an amount insufficient to cause illumination when said alternator output voltage is maintained at a predetermined level.

References Cited by the Examiner

UNITED STATES PATENTS

| | | | |
|---|---|---|---|
| 2,809,301 | 10/57 | Short | 320—53 |
| 2,817,830 | 12/57 | Raver | 340—249 |
| 2,897,429 | 7/59 | Jochems | 307—88.5 |
| 3,047,727 | 7/62 | McAllise | 340—252 |
| 3,094,652 | 6/63 | Zoppi et al. | 340—248 |

NEIL C. READ, *Primary Examiner.*